US009560836B2

(12) United States Patent
DeBien

(10) Patent No.: US 9,560,836 B2
(45) Date of Patent: Feb. 7, 2017

(54) RETRACTABLE ANIMAL TETHER

(71) Applicant: DeBien Products, Inc., Titusville, FL (US)

(72) Inventor: Humberto DeBien, Titusville, FL (US)

(73) Assignee: Swiftipet, Inc., Titusville, FL (US)

( * ) Notice: Subject to any disclaimer, the term of this patent is extended or adjusted under 35 U.S.C. 154(b) by 90 days.

(21) Appl. No.: 14/476,975

(22) Filed: Sep. 4, 2014

(65) Prior Publication Data
US 2016/0066545 A1 Mar. 10, 2016

(51) Int. Cl.
*A01K 27/00* (2006.01)
(52) U.S. Cl.
CPC .................... *A01K 27/004* (2013.01)
(58) Field of Classification Search
CPC .. A01K 27/004; A01K 27/005; A01K 27/003; A01K 27/00
See application file for complete search history.

(56) References Cited

U.S. PATENT DOCUMENTS

| | | | | |
|---|---|---|---|---|
| 3,171,183 A * | 3/1965 | Johnston | ............... | A01K 27/005 24/635 |
| 5,887,550 A * | 3/1999 | Levine | ................. | A01K 27/004 119/796 |
| 6,003,472 A * | 12/1999 | Matt | .................... | A01K 27/004 119/794 |
| 6,024,054 A * | 2/2000 | Matt | .................... | A01K 27/004 119/796 |
| 6,213,421 B1 * | 4/2001 | Franklin | ............... | B60C 27/066 152/219 |
| 6,247,427 B1 * | 6/2001 | DeBien | ................ | A01K 27/005 119/776 |
| 6,308,662 B1 * | 10/2001 | Furman | ................ | A01K 27/005 119/772 |
| 6,629,511 B2 * | 10/2003 | De Bien | ............. | A01K 27/005 119/776 |
| 6,688,260 B2 * | 2/2004 | Morrison | ............ | A01K 27/004 119/796 |
| 6,712,026 B1 * | 3/2004 | Carville, Jr. | ........ | A01K 27/004 119/794 |
| 6,955,138 B2 * | 10/2005 | DeBien | ................ | A01K 27/005 119/718 |
| 7,040,257 B2 * | 5/2006 | Waxman | ............. | A01K 27/004 119/796 |
| 7,131,401 B2 * | 11/2006 | Huff | ..................... | A01K 27/004 119/794 |
| 7,162,978 B2 * | 1/2007 | Debien | ................ | A01K 27/005 119/772 |
| 7,389,750 B1 * | 6/2008 | Rogers | ................ | A01K 27/005 119/792 |
| 7,549,399 B2 * | 6/2009 | Hurwitz | ............... | A01K 27/006 119/796 |

(Continued)

*Primary Examiner* — Kristen C Hayes
(74) *Attorney, Agent, or Firm* — Kelly G. Swartz; Widerman Malek, PL

(57) ABSTRACT

An apparatus for tethering an animal is disclosed. The apparatus has a leash housing, a retractor assembly contained within the leash housing, a tether with a first end connected to the retractor assembly and a second end extensible through a leash connector cavity opening disposed in the leash housing and connected to a leash connector, and at least one leash connector release that is capable of being depressed by a leash connector cavity wall when the leash connector is retracted into the leash connector cavity.

12 Claims, 5 Drawing Sheets

(56) References Cited

U.S. PATENT DOCUMENTS

| | | | | |
|---|---|---|---|---|
| 7,819,088 B2* | 10/2010 | Stern | ............... | A01K 27/004 |
| | | | | 119/796 |
| 8,209,825 B2* | 7/2012 | Carter | ............... | C07H 11/04 |
| | | | | 24/606 |
| 8,474,414 B2* | 7/2013 | Dagnon | ............ | A01K 27/004 |
| | | | | 119/794 |
| 2003/0145801 A1* | 8/2003 | DeBien | ............ | A01K 27/005 |
| | | | | 119/772 |
| 2004/0200435 A1* | 10/2004 | Debien | ............ | A01K 27/005 |
| | | | | 119/772 |
| 2004/0237906 A1* | 12/2004 | Waxman | ............ | A01K 27/004 |
| | | | | 119/796 |

* cited by examiner

RETRACTABLE ANIMAL TETHER

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to field of animal tethers, more specifically, the present invention relates to a retractable device for securing an animal to a tether.

2. Background Art

Millions of pets, many of these dogs, are walked at least once each day. Most of these pets are not sufficiently trustworthy to be walked without some type of constraint, such as a leash. The use of leashes causes many conflicts between a pet and its master. A leash must be connected to and disconnected from an animal each time the animal is walked. Many animals may be excited or agitated by this task and often jump, struggle, or otherwise move while the owner is attempting to connect or disconnect the leash. Consequently, it is desirable to minimize or eliminate the need for the human to participate in the act of connecting to and disconnecting from the collar of the animal.

Another problem related to the conventional retractable leash is so serious that it often causes injury to the pet or human holding the leash. On frequent occasions, animals have been agitated or excited and break away from their owner. It is not uncommon for the owner to have a loose hold on the leash and for an animal's unexpected movement to rip the leash from the hand of the handler resulting in the animal dragging its leash behind it. In such a situation with a traditional retractable leash the housing into which the leash retracts would advance toward the animal as it retracts, serving to further agitate or frighten the animal.

The prior art has not satisfactorily devised a solution to these problems. Prior art devices require a human to locate the portion of the leash that connects to the animal's collar and manually attach and remove it. Also, prior art devices bias the leash to retract if not actively maintained in an extended configuration. It is, therefore, desirable to have a retractable leash that is easily connected to and disconnected from an animal and maintained in an extended position until the owner takes action to retract the leash.

BRIEF SUMMARY OF THE INVENTION

The present invention is directed to the idea of and an apparatus for a retractable leash which is designed to automatically engage and disengage with an animal's collar, harness or other securing apparatus.

One embodiment of the invention may utilize a retractable leash with a rigid leash housing. A leash connector may be positioned outside of the leash housing and connected to the apparatus by a tether, which is secured to a retractor assembly located within the leash housing. When the retractor assembly is in a fully retracted position, the leash connector may be positioned into a leash connector cavity opening disposed on the leash housing. When positioned in this opening, the leash connector may be in a configuration which prevents it from coupling with a collar connector disposed on an animal's collar. However, when the leash connector is brought into proximity with a collar connector, corresponding magnets on the leash connector and collar connector may attract the connectors to one another and cause the two connectors to position themselves in a configuration which enables the structure of the two connectors to securely mate to one another. This coupled configuration may be maintained until the human depresses a retractor button disposed on the leash housing, which causes the tether to move to a fully retracted position and positions the leash connector in the leash connector cavity opening. The configuration of the leash connector cavity opening may displace the securing portion of the leash connector and result in a decoupling of the leash connector and collar connector.

The retractor assembly of the invention may comprise a retractor wheel with retractor teeth disposed along the perimeter of the retractor wheel. A retraction stop may engage a retractor tooth to prevent the retractor wheel from rotating, thereby maintaining the leash at a fixed extended length. When the user depresses a retraction stop, the retraction stop may disengage with the retractor teeth and allow the retractor wheel to rotate freely, thereby allowing the tether to lengthen or shorten according to the forces exerted on the tether. A spring located inside the retractor assembly may bias the retractor wheel to spin in a direction which shortens the extended length or the tether, retracts the tether, if no force is exerted on the end of the tether to which the leash connector is connected. If force is exerted on the leash connector, the retractor wheel may spin in a direction which allows the tether to lengthen, extends the tether.

BRIEF DESCRIPTION OF THE DRAWINGS

A better understanding of the present invention will be realized from the detailed description that follows, taken in conjunction with the accompanying drawings, in which:

FIG. 1a depicts a detailed view of one embodiment of the connector component.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
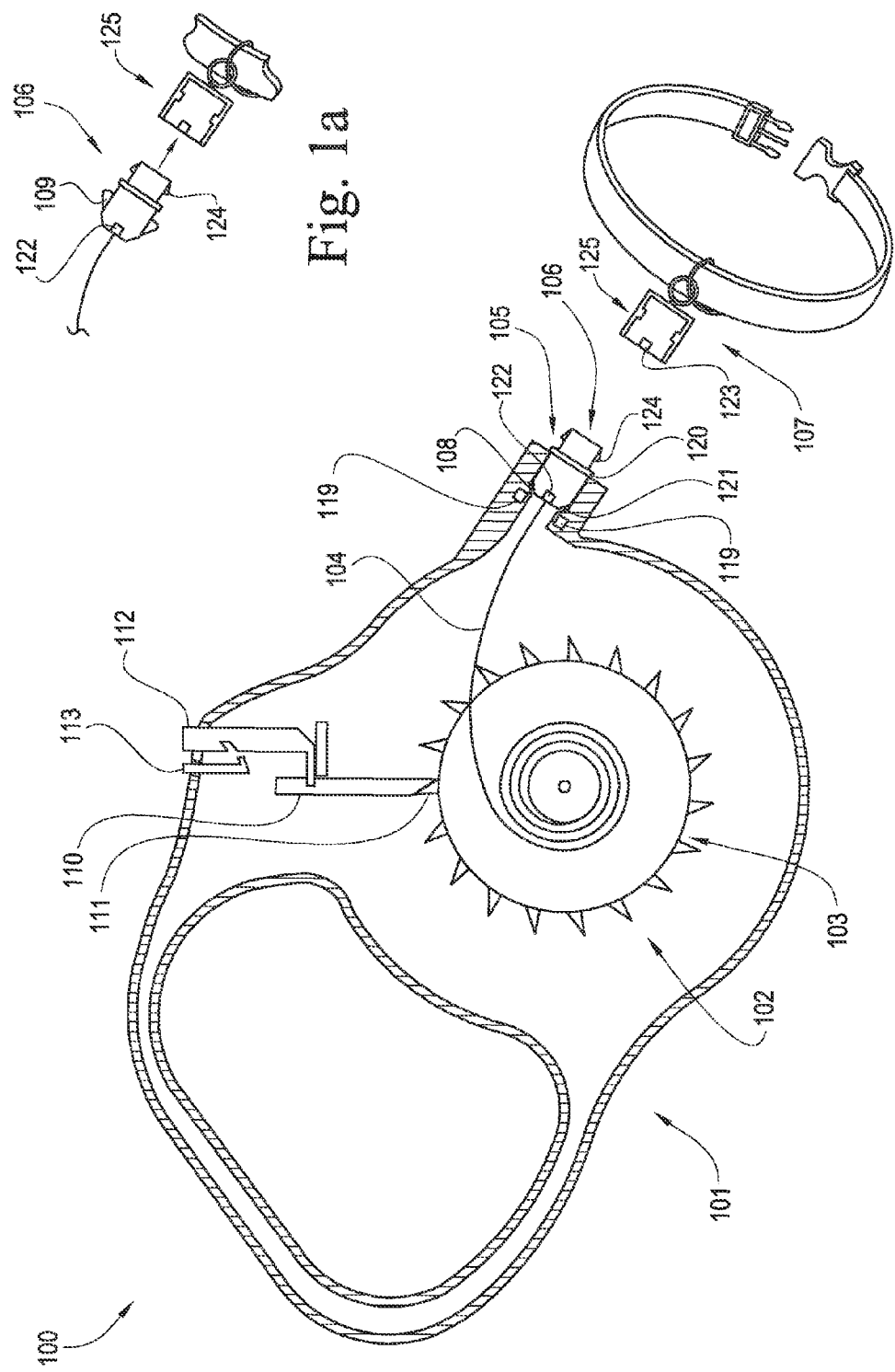
FIG. 1 depicts one embodiment of the inventive device.

FIG. 1 depicts one embodiment of the retractable leash 100, which may have a leash housing 101 and a retractor assembly 102. The retractor may be located within the leash housing 101 and secured to the leash housing in a manner which allows the retractor wheel 103 to rotate within the housing 101. In the embodiment depicted in FIG. 1, the retractor wheel 103 may rotate counterclockwise to retract the tether 104 and may rotate clockwise when the tether 104 is pulled by external forces, which allows the tether 104 to extend.

A spring may be disposed within the retractor assembly 102, which biases the retractor wheel 103 to rotate in a direction which retracts the tether 104 when no outside forces, other than that applied by the spring, act upon the retractor wheel 103. In some embodiments, the bias provided by the spring may be provided by magnets.

The tether 104 may have a first end connected to the retractor assembly 102. This connection may permanently secure the tether 104 to the retractor assembly 102 and prevent the tether 104 from completely leaving the leash housing 101 when the tether 104 is fully extended. The tether 104 may have a second end, which may extend through a leash connector cavity opening 105 disposed in the leash housing 101, connected to a leash connector 106.

The leash connector 106 may be configured to couple to a collar connector 107. When the leash connector 106 is positioned in the leash connector cavity opening 105, the leash connector cavity wall 108 may depress at least one leash connector release 109. Depression of the at least one leash connector release 109, may cause the leash connector 106 to decouple from the collar connector 107. FIG. 1a depicts a detailed view of the leash and collar connectors 106, 107.

The leash connector 106 may attach to a collar connector 107, which may be disposed on an animal's collar, harness, or other securing apparatus. For simplicity, the term "collar" is used throughout this specification and includes harnesses, collars, and other devices which may be used to secure a tether to an animal.

The retractable leash 100 may have a retraction stop 110, which is normally disposed in an impeding position, as depicted in FIG. 1. In this normally impeding position, the distal end of the retraction stop 110 may be in contact with a retractor tooth 111 and prevent rotation of the retractor wheel 103. A retractor button 112 may extend through the leash housing and be accessible by a human holding the retractable leash 100. When the human depresses the retractor button 112, or activates the retractor button 112, the retraction stop 110 may move away from the retractor tooth 111, into a non-impeding position, and allow the retractor wheel 103 to rotate in accordance with the forces applied to the retractor wheel 103.

A retractor button detent 113 may extend through the leash housing 101 and be utilized to maintain the retractor stop 110 in the non-impeding position. When the retractor stop 110 is activated, the retractor button detent 113 may be depressed by the human user of the device. Depressing the retractor button detent 113 may engage the retractor button detent 113 with the retractor stop 110 and maintain the retractor stop 110 in the non-impeding position. A subsequent depression of the retractor button detent 113 may disengage the retractor button detent 113 from the retractor stop 110 and allow the retractor stop 110 to return to an impeding position. While the retractor button 112 is activated, consecutive depressions of the retractor button detent 113 may toggle the position of the retractor button detent 113 to either maintain the retraction stop 110 in a non-impeding position or allow the retraction stop 110 to move to an impeding position.

At least one leash connector cavity magnet 119 may be located in the leash connector cavity wall 108, in the leash connector stop 120, or at other positions near the leash connector cavity 120. The at least one leash connector cavity magnet 119 may attract the leash connector 106 to assist in placing the leash connector 106 into a fully retracted position. When in the fully retracted position, the leash connector 106 may be in contact with the leash connector stop 120. The leash connector stop 120 may prevent the leash connector 106 from passing further into the leash connector cavity 121. When in the fully retracted position, the leash connector cavity wall 108 may depress at least one leash connector release 109 and cause the leash connector 106 to uncouple from the collar connector 107. When moved out of the fully retracted position, the at least one leash connector release 109 may move to a non-depressed position and allow the leash connector 106 to couple with the collar connector 107.

In one embodiment, a ferromagnetic material may be disposed in or near the leash connector cavity to attract a magnet located in the leash connector 106 and to induce the leash connector 106 to move to a fully retracted position. In one embodiment, a leash connector cavity magnet 119 may be disposed in or near the leash connector cavity and attract a ferromagnetic material located in the leash connector 106, to induce the leash connector 106 to move to a fully retracted position.

A leash connector magnet 122 may be disposed in or on the leash connector 106. This leash connector magnet 122 may attract a collar connector magnet 123 with an opposite polarity. When the leash connector magnet 122 and the collar connector magnet 123 couple, the bodies of the leash connector 106 and the collar connector 107 may couple and lock together. In such a configuration, the leash connector 106 may be placed in the fully retracted position and then the retractable leash 100 may be brought in proximity to an animal wearing a collar connector 107. By maneuvering the leash connector 106 close to the collar connector 107, the human may cause the animal's collar connector 107 to become attracted to the least connector 106. As the magnets 122, 123 located in the two connectors attract one another, the leash connector 106 will move away from the leash connector stop 120, the at least one leash connector release 109 will move to a non-depressed state, allowing the leash connector 106 to mate to the collar connector 107, and the magnets 122, 123 in the two connectors 106, 107 will position the connectors 106, 107 in a coupled configuration. These connectors 106, 107 will remain coupled until the leash connector 106 is placed back in the fully retracted position, allowing the connectors 106, 107 to decouple.

In one embodiment, as depicted in FIG. 1a, the leash connector 106 may have at least one retractable extender 124. In such an embodiment, the collar connector 107 may have at least one extender receiver 125 configured to receive the retractable extender 124. When the collar connector 107 is inserted into the leash connector 106, the at least one retractable extender 124 may be positioned in the extender receiver 125. The retractable extender 124 may be retained in the extender receiver 125 and prevent the leash connector 106 and collar connector 107 from decoupling unless the at least one leash connector release 109 is depressed, which retracts the retractable extender 124 and allows the collar connector 107 to be removed from the leash connector 106.

Figure 2:
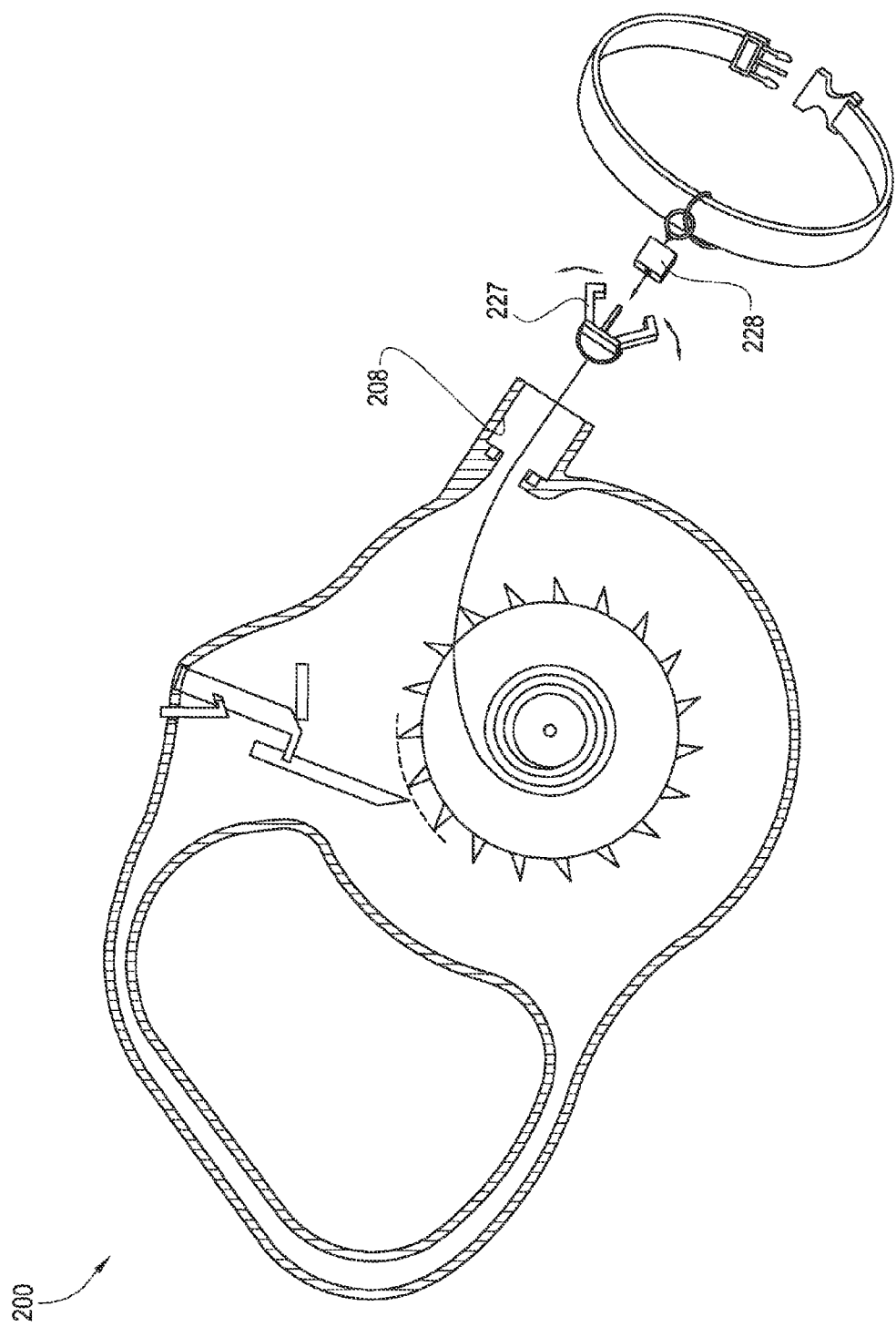
FIG. 2 depicts one embodiment of the inventive device.

FIG. 2 depicts one embodiment of the retractable leash 200, in which the leash connector has an extendable retractor 227. The collar connector has a retractor receiver 228. When the extendable retractor 227 is retracted, the retractor receiver 228 is captured by the extendable retractor 227 and the two connectors are coupled. When the extendable retractor 227 is extended, the retractor receiver 228 is released by the extendable retractor 227 and the two connectors may be decoupled. The leash connector may have a leash connector magnet and the collar connector may have a complimentary collar connector magnet. When these two magnets are attracted to one another, the retractor receiver 228 may move into a position in which it is captured by the extendable retractor 227. The retractor receiver 228 may not be released until the extendable retractor 227 is extended. In such an embodiment, when the leash connector is in a fully retracted position, the leash connector cavity wall 208 may extend the extendable retractor 227 and allow the two connectors to be decoupled.

Figure 3:
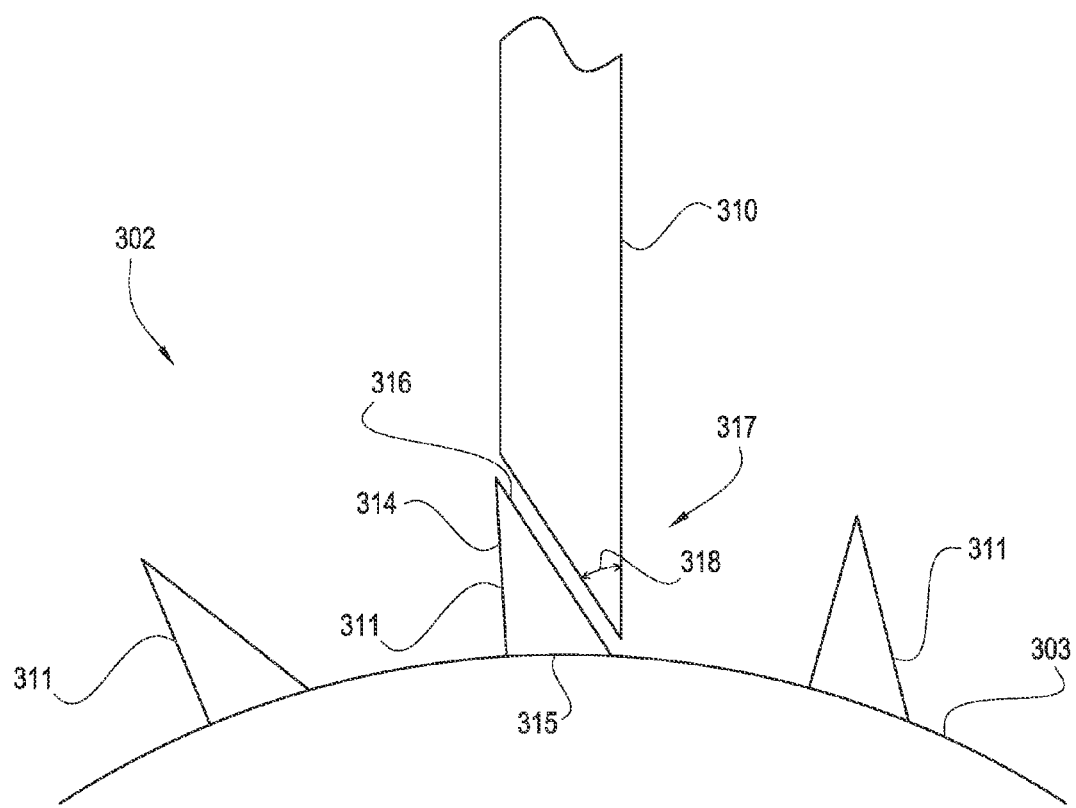
FIG. 3 depicts a portion of the retractor assembly.

FIG. 3 shows a detailed depiction of portions of the retractor assembly 302. A plurality of retractor teeth 311 may be disposed along the perimeter of the retractor wheel 303. The retractor teeth 311 may essentially be right triangles. One edge of the retractor tooth 311 may extend perpendicularly away from the retractor wheel 303. This perpendicular edge may be referred to as edge A 314. Another edge of the essentially right triangle may be joined to the circumference of the retract wheel 303 and referred to as edge B 315. The hypotenuse may connect edge A 314 with edge B 315 and be referred to as edge C 316.

The retractor stop 310 may have a distal end 317, which may contact one or more of the retractor teeth 311. When in the normally impeding position, as shown in FIG. 3, the distal end 317 may come into contact with edge C 316. This contact may prevent rotation of the retractor wheel 303, thereby preventing the tether from extending or retracting. When in contact with edge C 316, the retractor stop 310 may be said to be in the normally impeding position. When the retractor stop 310 is positioned above the retractor teeth 311, the retractor stop 310 may be said to be in the non-impeding position. The distal end 317 may be angled to align with and lay flat against edge C. To accomplish this, the distal end 317 may have a retractor stop angle 318, which is essentially equal to the angle between edge A 314 and edge C 316. The sum of the retractor stop angle 318 and the angle formed by edge B 315 and edge C 316 is essentially 90 degrees.

The plurality of retractor teeth 311 may be disposed around the circumference of the retractor wheel 303 with spaces between adjacent retractor teeth 311. The spaces between adjacent teeth 311 may be equal to or less than edge B. Such spacing will limit the length of tether that may be extended from or retracted into the leash housing between the time when the retractor stop is placed into the impeding position and the retractor wheel 303 stops rotating.

Figure 4:
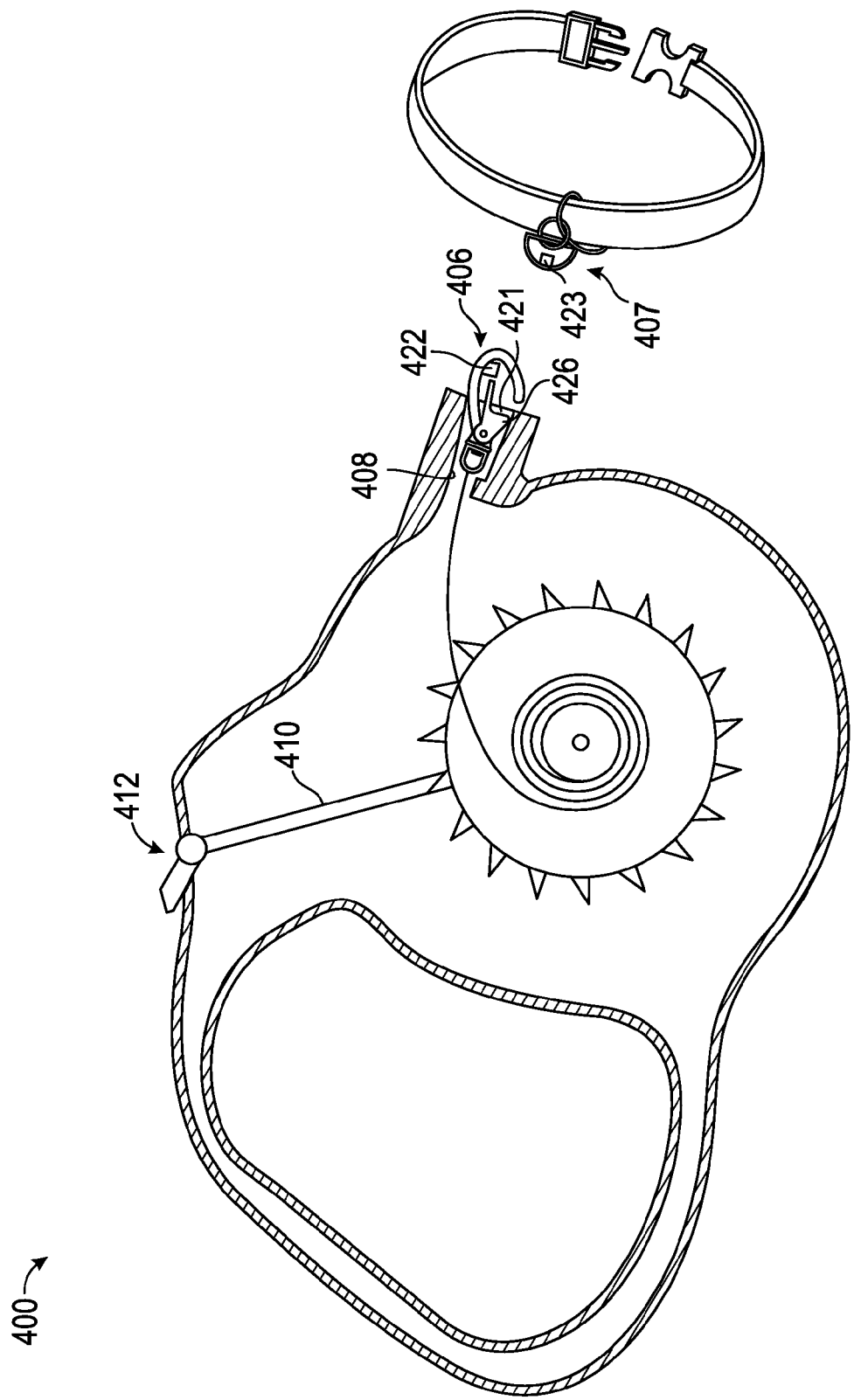
FIG. 4 depicts one embodiment of the inventive device.

FIG. 4 depicts an embodiment of the retractable leash 400, in which the leash connector 406 has a movable gate 426. The collar connector 407 may be a ring. In such an embodiment, the leash connector 406 may enter the leash connector cavity 421 and the leash connector cavity wall 408 may cause the movable gate 426 to move inward, to an open configuration. This movement may cause an opening in the leash connector 406, through which the collar connector 407 may pass. When in the fully retracted position, the movable gate 426 may be positioned to create an opening through which the collar connector 407 may pass.

A leash connector magnet 422 may be disposed in or on the leash connector 406. This leash connector magnet 422 may attract a collar connector magnet 423 with an opposite polarity. When the leash connector magnet 422 and the collar connector magnet 423 couple, the bodies of the leash connector 406 and the collar connector 407 may couple and lock together.

An embodiment of the retractor assembly is depicted in FIG. 4. The retractor button 412 may be moved forward by a person holding the retractable leash 400, which would move the retractor stop 410 up and away from the retractor tooth and allow the retractor wheel to rotate freely.

While the above description contains much specificity, these should not be construed as limitations on the scope of any embodiment, but as exemplifications of the presently preferred embodiments thereof. Many other ramifications and variations are possible within the teachings of the various embodiments.

Figure 5:
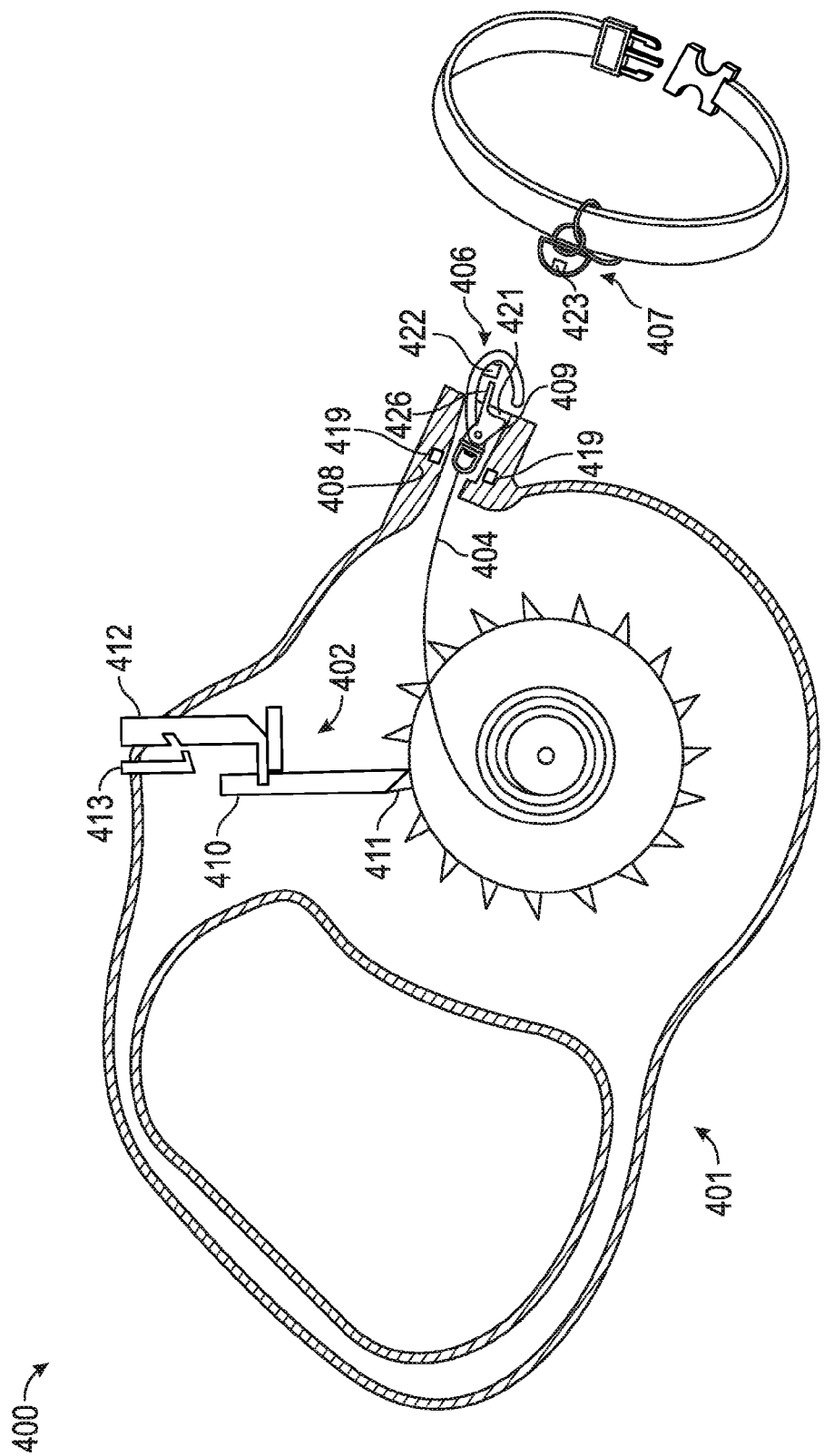
FIG. 5 depicts another embodiment of the retractable leash.

As depicted in FIG. 5, the retractor assembly 402 as depicted in FIG. 1 may be combined with the leash connector 406 depicted in FIG. 4. The tether 404 may have a first end connected to the retractor assembly 402. The retractor assembly 402 may be in a normally impeding position, wherein the distal end of the retraction stop 410 may be in contact with a retractor tooth 411 and prevent rotation of the retractor wheel. The retractor button detent 413 may extend through the leash housing 401 and be utilized to maintain the retractor stop 410 in the non-impeding position. When the retractor stop 410 is activated, the retractor button detent 413 may be depressed by the human user of the device. Depressing the retractor button detent 413 may engage the retractor button detent 413 with the retractor stop 410 and maintain the retractor stop 410 in the non-impeding position. A subsequent depression of the retractor button detent 413 may disengage the retractor button detent 413 from the retractor stop 410 and allow the retractor stop 410 to return to an impeding position. While the retractor button 412 is activated, consecutive depressions of the retractor button detent 413 may toggle the position of the retractor button detent 413 to either maintain the retraction stop 410 in a non-impeding position or allow the retraction stop 410 to move to an impeding position.

At least one leash connector cavity magnet 419 may be located in the leash connector cavity wall 408, in the leash connector stop, or at other positions near the leash connector cavity. The at least one leash connector cavity magnet 419 may be used in combination with a leash connector 406 having a movable gate 426 to attract the leash connector 406 or to assist in placing the leash connector 406 into a fully retracted position. When the leash connector 406 is positioned in the leash connector cavity opening, the leash connector cavity wall 408 may depress at least one leash connector release 409. Depression of the at least one leash connector release 409, may cause the leash connector 406 to decouple from the collar connector 407.

Thus the scope of the invention should be determined by the appended claims and their legal equivalents, and not by the examples given.

What is claimed is:

1. An apparatus for tethering an animal comprising:
   a leash housing;
   a retractor assembly contained within the leash housing;
   a tether with a first end connected to the retractor assembly and a second end extensible through a leash connector cavity opening disposed in the leash housing and connected to a leash connector having a movable gate adapted to secure to a ring secured to a collar;
   a leash connector magnet having a polarity disposed on the leash connector;
   a collar connector magnet having an opposite polarity configured to position the leash connector and a collar connector in a coupled configuration when the leash connector is in close proximity to the collar connector; and at least one leash connector release that is capable of being depressed by a leash connector cavity wall when the leash connector is retracted into the leash connector cavity.

2. The apparatus according to claim 1 wherein the retractor assembly further comprises a plurality of retractor teeth disposed on the perimeter of a retractor wheel wherein the retractor teeth are essentially right triangles with a hypotenuse extending between the retractor wheel and the top of the retractor tooth; and wherein the distal end of the retraction stop is configured to contact the hypotenuse of the retractor tooth when in the normally impeding position and the distal end of the retraction stop has a retractor stop angle essentially equal to the retractor tooth angle between the hypotenuse and the wall extending essentially perpendicularly from the retractor wheel.

3. The apparatus according to claim 1 wherein the retractor assembly further comprises a plurality of retractor teeth disposed on the circumference of a retractor wheel wherein the distance between adjacent retractor teeth is equal to or less than the length of the portion of the retractor tooth is contact with the retractor wheel.

4. The apparatus according to claim 1 wherein the leash connector comprises at least one retractable extender; and the collar connector comprises at least one extender receiver;

wherein the leash connector magnet and collar connector magnet position the leash connector and collar connector to couple the at least one retractable extender with the at least one extender receiver.

5. The apparatus according to claim 4 wherein the at least one leash connector release is capable of positioning the at least one retractable extender in a retracted configuration when the leash connector is positioned in the leash connector cavity.

6. The apparatus according to claim 4 wherein the connector cavity comprises a retractor extender capable of positioning the at least one extendable retractor in an extended configuration when the leash connector is positioned in the leash connector cavity.

7. The apparatus according to claim 1 wherein the leash connector cavity wall is capable of positioning the movable gate in an open configuration when the leash connector is positioned in the fully retracted position.

8. The apparatus according to claim 1 wherein the leash connector comprises at least one extendable retractor; and the collar connector comprises at least one retractor receiver;

wherein the leash connector magnet and collar connector magnet position the leash connector and collar connector to couple the at least one extendable retractor with the at least one retractor receiver.

9. The apparatus according to claim 1 wherein the leash connector comprises a leash connector stop configured to prevent the leash connector from passing through the leash connector cavity.

10. An apparatus for tethering an animal comprising:
a leash housing;
a tether with a first end connected to a retractor assembly and a second end connected to a leash connector having a movable gate adapted to secure to a ring secured to a collar, wherein the leash connector is extensible through a leash connector cavity opening disposed upon the leash housing;
a leash connector magnet having a polarity disposed on the leash connector; and
a collar connector magnet having an opposite polarity configured to position the leash connector and a collar connector in a coupled configuration when the leash connector is in close proximity to the collar connector;
wherein the retractor assembly further comprises a plurality of retractor teeth disposed on the perimeter of a retractor wheel;
wherein the retractor teeth are essentially right triangles with a hypotenuse extending between the retractor wheel and the top of the retractor tooth;
wherein a distal end of a retraction stop is configured to contact the hypotenuse of the retractor tooth when in a normally impeding position; and
wherein the distal end of the retraction stop has a retractor stop angle equal to the retractor tooth angle between the hypotenuse and the wall extending essentially perpendicularly from the retractor wheel.

11. The apparatus according to claim 10 wherein the distance between adjacent retractor teeth is equal to or less than the length of the portion of the retractor tooth in contact with the retractor wheel.

12. The apparatus according to claim 10 further comprising:
a retractor button, wherein the retraction stop is capable of moving into a non-impeding position while the retractor button is activated.

* * * * *